United States Patent [19]
Harris et al.

[11] 4,360,849
[45] Nov. 23, 1982

[54] POWER DISTRIBUTION SYSTEM

[75] Inventors: David L. Harris, New Berlin; Daniel T. Elwing; Howard T. Jones, both of Waukesha, all of Wis.

[73] Assignee: RTE-ASEA Corporation, Waukesha, Wis.

[21] Appl. No.: 240,342

[22] Filed: Mar. 4, 1981

[51] Int. Cl.³ .............................................. H02H 7/04
[52] U.S. Cl ....................................... 361/39; 361/36; 361/333
[58] Field of Search ................. 361/332, 333, 334, 35, 361/36, 37, 38, 39; 339/88 R, 90 C; 336/61

[56] References Cited

U.S. PATENT DOCUMENTS

| | | | |
|---|---|---|---|
| 2,237,812 | 4/1941 | De Blieux | 361/333 |
| 2,525,499 | 10/1950 | Peterson et al. | 361/37 |
| 2,917,701 | 12/1959 | Salton | 361/37 X |
| 3,073,993 | 1/1963 | Leonard et al. | 361/39 |
| 3,112,976 | 12/1963 | Knight | 339/90 C X |
| 3,449,633 | 6/1969 | Fischer et al. | 361/37 |
| 3,467,178 | 9/1969 | Ware | 336/61 X |
| 3,666,992 | 5/1972 | Goodman | 361/39 |
| 3,832,600 | 8/1974 | Specht | 361/36 |
| 3,883,208 | 5/1975 | Sankey et al. | 339/111 X |
| 4,141,054 | 2/1979 | Colaico | 361/333 |

Primary Examiner—Reinhard J. Eisenzopf
Attorney, Agent, or Firm—Ronald E. Barry

[57] ABSTRACT

A distribution substation including a transformer module and a feeder module. The transformer module including a tank, a transformer having primary and secondary windings immersed in insulating oil within the tank, a radiator connected to the tank for cooling the oil in the tank, a primary bushing mounted on one of the side walls of the tank at an angle and being connected to the primary of the transformer, a secondary bushing mounted on the top of the tank connected to the secondary winding of the transformer, a primary circuit breaker mounted on the tank in close proximity to the primary bushing, a lightning arrester mounted on the top of the tank in close proximity to the primary bushing. The feeder module including a transition cubicle and a feeder cubicle. The transition cubicle including an input bushing and a feed-through bushing connected to the input bushing, the input bushing being connected to the secondary bushing of the transformer module and a secondary circuit breaker in the feeder cubicle, a bushing junction in the feeder cubicle connected to the feed-through bushing in the transition cubicle by an insulated cable assembly having visible break terminators at each end, a pair of bushings in the feeder cubicle connected to the low voltage circuit breaker and an insulated cable assembly connecting the bushing junction to one of the pair of bushings in the feeder cubicle. The cable assembly including a Visi-break terminator at one end and a twist-lock terminator at the other end.

23 Claims, 9 Drawing Figures

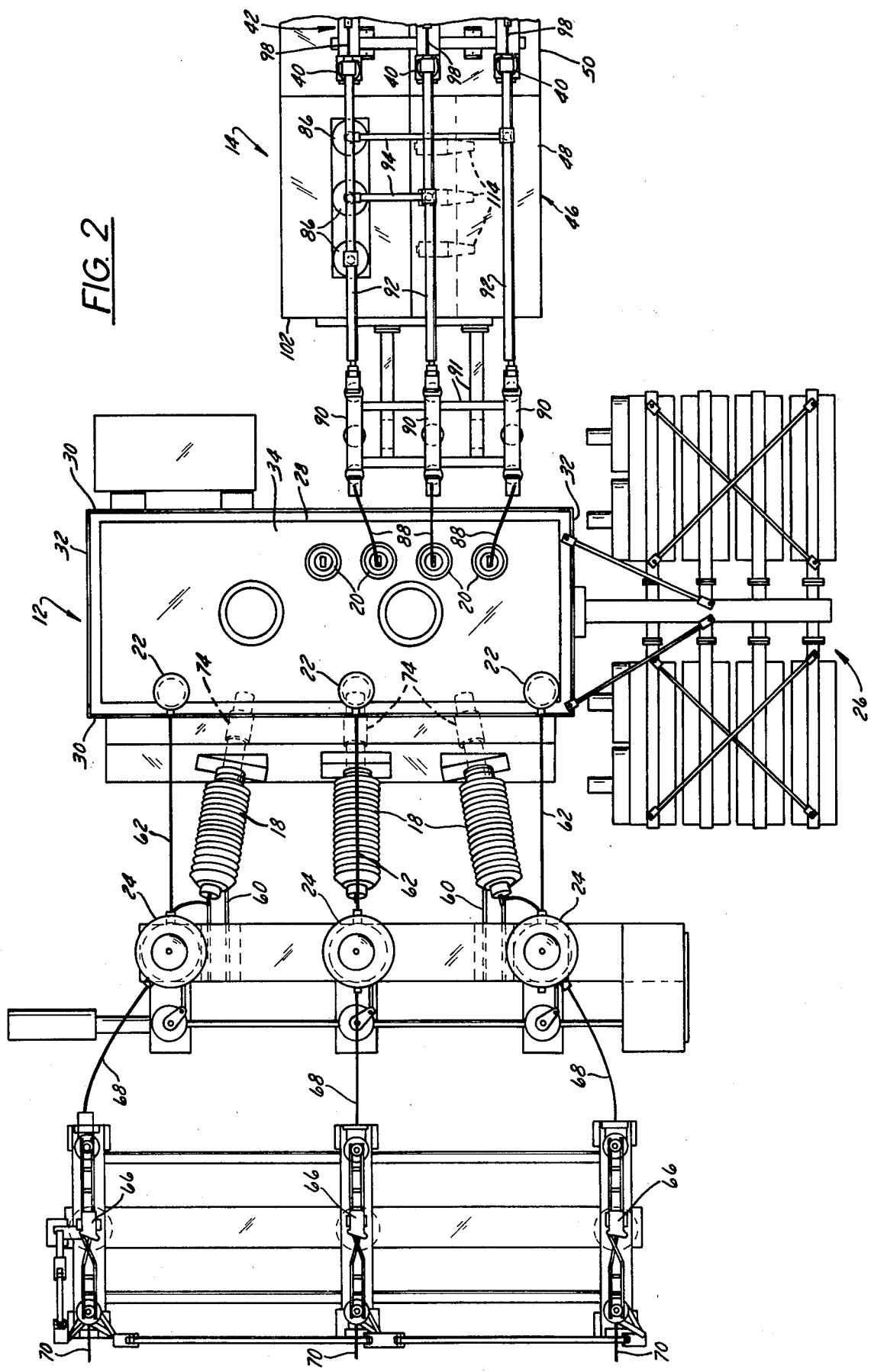

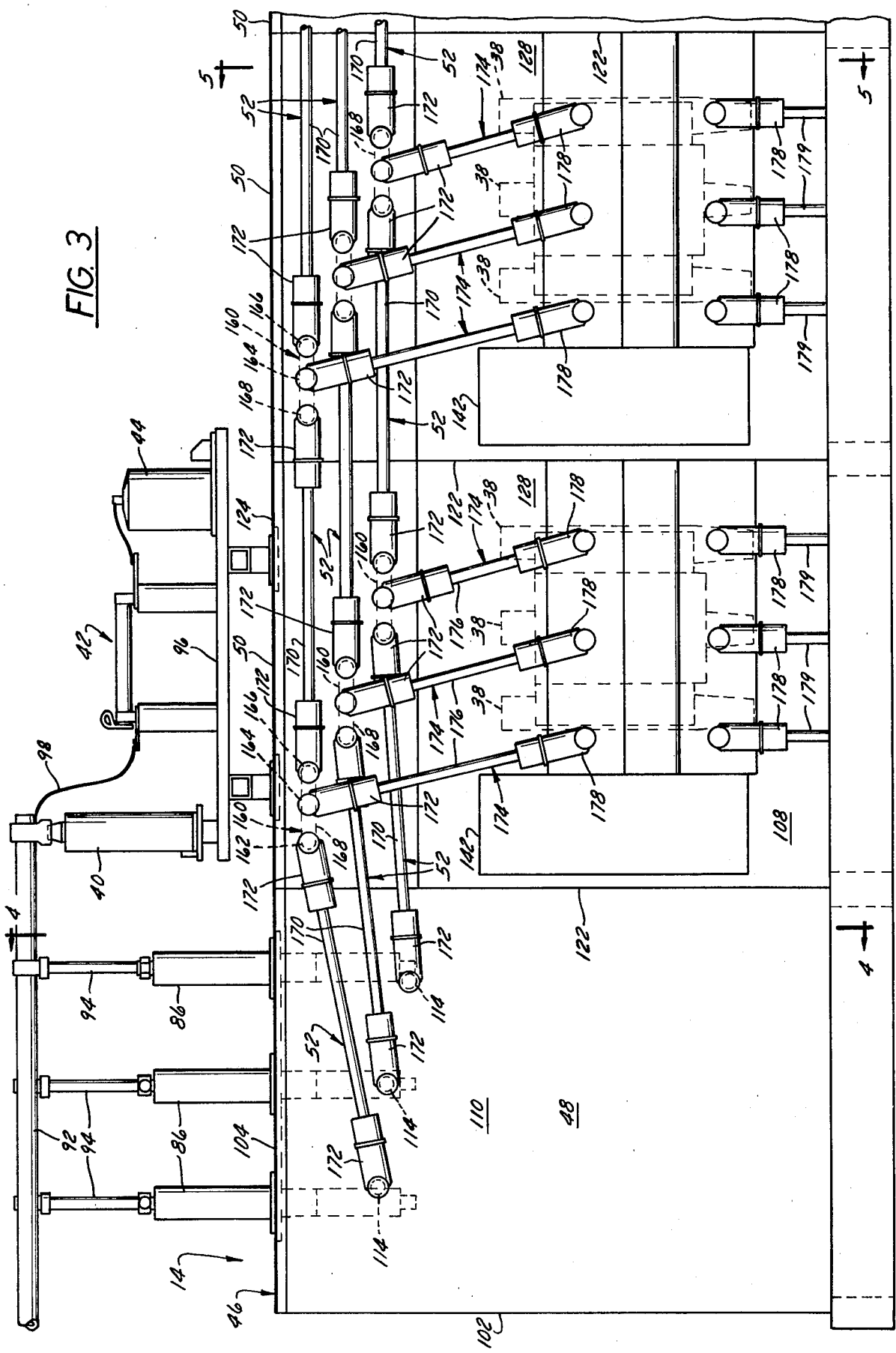

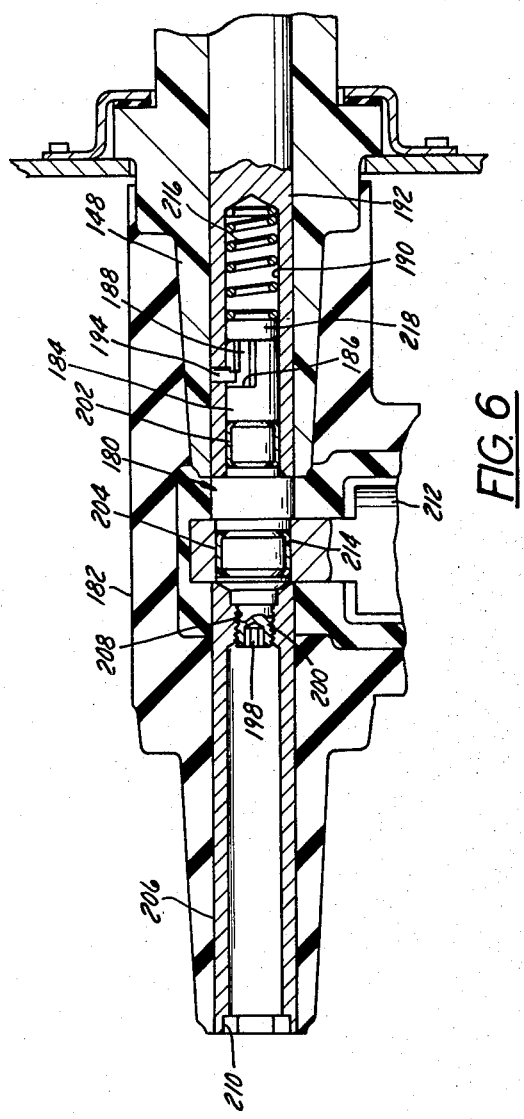
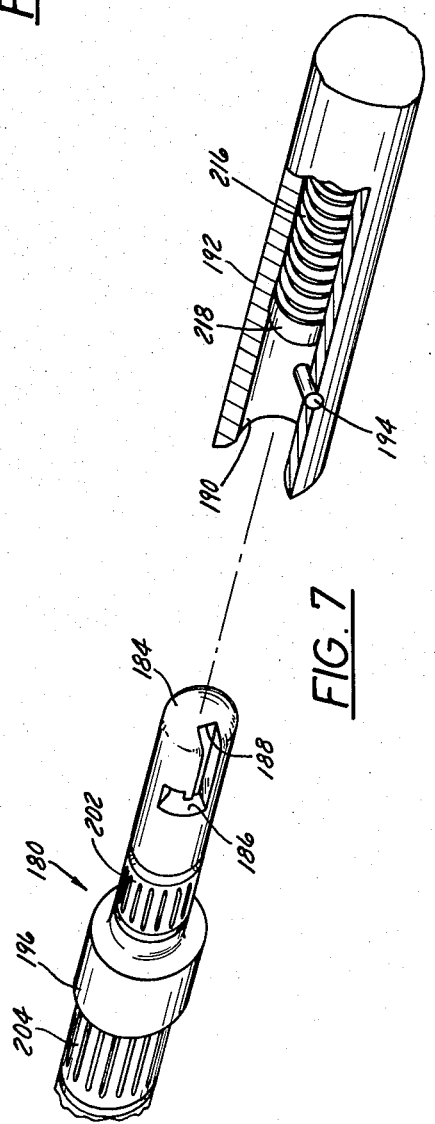
FIG. 6
FIG. 7

ADDITIONAL FEEDERS

FEEDER CIRCUIT
FEEDER CIRCUIT

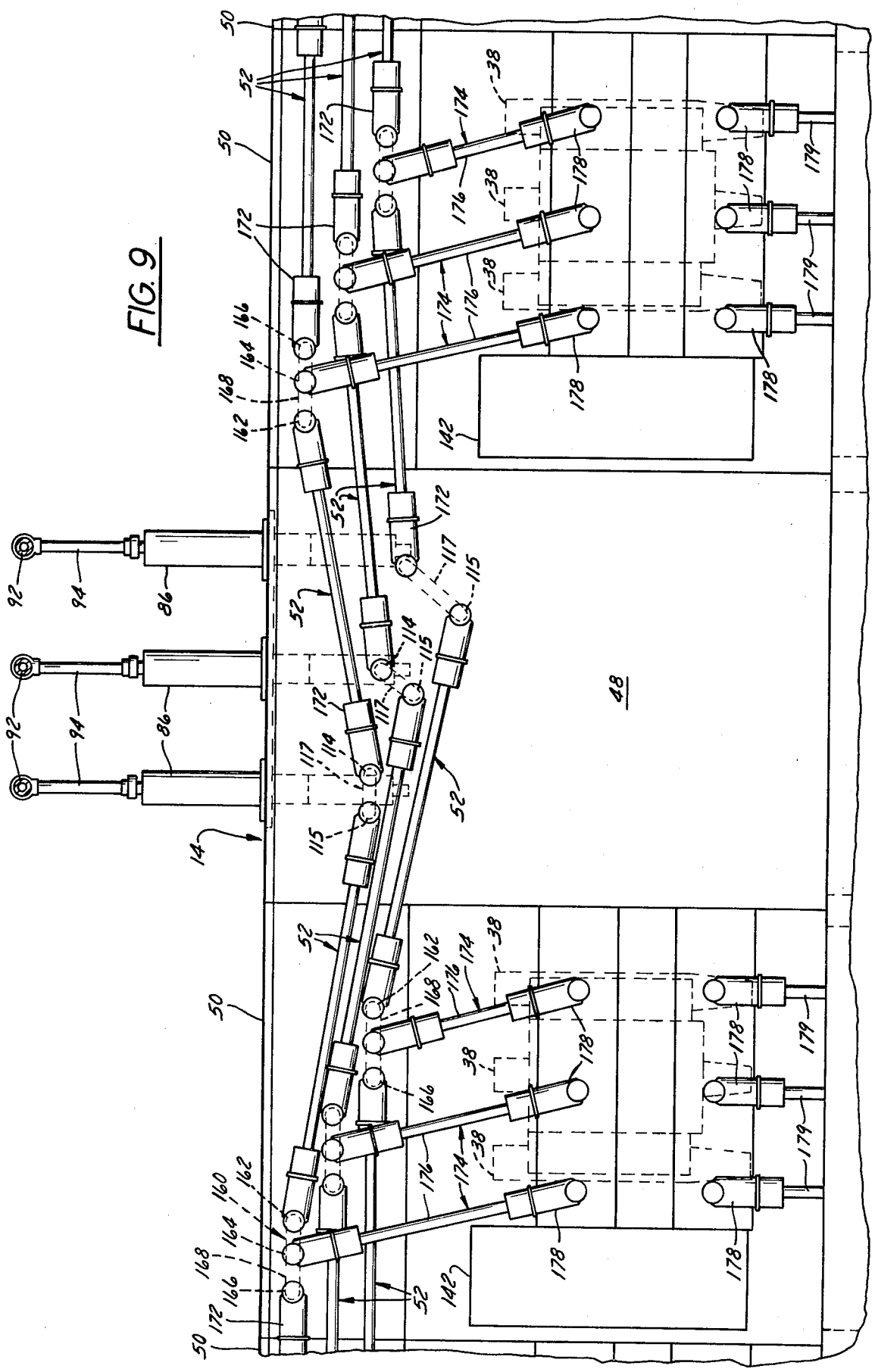

POWER DISTRIBUTION SYSTEM

BACKGROUND OF INVENTION

The transmission of electrical power from an electric generator to residential areas involves a combination of transmission devices which make up a transmission system. In a typical transmission system, power is generated by a hydroelectric installation, a steam installation or a nuclear plant. The output from the generator is normally approximately 25 kv. The output from the generator is transmitted to a step up substation where the voltage is increased to a transmission line voltage of 230 kv or higher. The next substation encountered is a transmission substation where the transmission voltage is decreased from the transmission line voltage to a subtransmission voltage of approximately 69 kv. A distribution substation is then used to step the voltage down from the transmission voltage to a distribution voltage of 5 to 35 kv. The distribution voltage is the voltage that is transmitted to the residential area either through overhead or underground distribution systems. Single phase transformers are provided at the residential level to reduce the voltage to the 240–120 single phase, three wire residential power entrance.

Because of the increased costs for labor, equipment and land, there is a need for finding ways to reduce the total costs at each of the power distribution levels. One of the levels which can be improved to reduce costs and preserve land is at the distribution substation level. Through habit and convention, it has been the practice of utilities to engineer their own substation designs, purchase the required components from a variety of sources, assemble and test those components at the substation site. One of the several problems with this approach is the equipment delivery schedule. This means that they may get the transformer in 26 weeks, but the switch gear may take 40 or 50 weeks. This increases cost, since the transformer must be carried as an inventory item until the switch gear is ready for assembly. The problem is compounded when the number of suppliers of the components that are to be used in the substation increases. Another problem, the components from individual manufacturers are not interchangeable and often modifications must be made at the site in order to adapt the various components to the system. Also, because the components are purchased from various manufacturers, manufacturing responsibility is divided, often resulting in delays in determining manufacturing responsibility for failure or disruption of service from the substation.

Large land areas are normally required for this type of substation since the various components are individually mounted on separate foundations within the substation complex and proper clearances must be maintained for safety and maintenance procedures.

A key requirement for the electrical industry is to maintain reliability of the electrical system so that the number of hours of outage or down time at the residential level is kept to a minimum. The goal is to provide service at the residential level with a minimum number of hours of down time.

As the demand for electric service, and the cost of fuel has increased, the utilities have considered raising the present voltage level of the distribution voltage system up to the sub-transmission voltage level. The reason for this is that the losses in the transmission line are proportional to the square of the current. As the voltage is increased with the same load expressed as MVA, the current decreases and therefore the losses in the transmission line decrease so the amount of power that can be delivered to the residential area is increased. This results in reduced operating costs.

A normal way to remove a transformer from service in a distribution substation is to use a disconnect switch with power fuses. Because of relay coordination problems, the power fuses are normally set quite high, so that the transformer will be subjected to this abnormality for a relatively long period of time before it can be cleared. Also, the fuses clear on a single phase basis, and do not permit the three phase de-energization of a transformer. With the right circumstances of capacitance, secondary voltage, and a lightly loaded transformer, this can cause a resonance between a magnetizing reactance of the transformer and the capacitance of the distribution system, and this can result in overvoltages on the transformer which would cause arcing and external flashovers. These could be dangerous to anyone in the substation area, and could result in a substation fire.

A substation generally employs a circuit breaker on the low voltage side of the transformer to remove load from the transformer in the event there is a fault. With a breaker on the secondary, fuses are felt to be adequate protection for the primary. However, it is not suitable to supply a differential relay to protect the transformer, as this relay senses internal faults in the transformer, therefore, the only way to effectively remove this internal fault is to remove the transformer from service with a three phase disconnect switch.

The transformer secondary is normally connected to some circuit breakers or other devices that can be used to switch the feeder circuits to the distribution system. This switchgear can be metal clad switchgear or an outdoor substation using oil circuit breakers, or it might possibly be merely a recloser. The outdoor substation is quite bulky, but it does offer maintenance advantages as the breakers can be individually bypassed; but it does require a large area of land. Metal clad switch gear is popular for industrial applications, but it is generally limited to 15 KV applications and has only recently becoming available at 25 and 35 KV. The reclosure is limited to approximately 600 Amps and is used basically in rural systems or on low priority loads.

SUMMARY OF INVENTION

The present invention, a power delivery system, contemplates a pre-packaged substation which can be used for 5 to 35 kv application. The substation is made up of independent modules which can be assembled at the point of manufacture, tested, disassembled, shipped to the customers site and easily assembled into a substation. All of the components which make up the substation are engineered, selected, assembled, and tested in the system by a single manufacturer. Included in this system are the transformer, primary circuit breakers, low voltage switch gear, relays, meters, lightning arresters and all other required hardware and accessories. The system is fully tested at the point of manufacture and retested after assembly at the site. Manufacturing responsibility is provided by a single manufacturer. Land costs are reduced since a single pad mount and a support pad are used to accomodate the transformer and feeder modules.

Each of the modules includes a number of unique features which makes it possible to prepackage the system for delivery to the site.

A low profile transformer is provided by mounting the high voltage circuit breakers and lightning arresters on the transformer tank near the primary bushings. The potential transformers and current transformers used with the high voltage switchgear are mounted inside the transformer tank rather than on a steel structure attached to a concrete pad.

The low voltage circuit breakers with the relay protection system meters, and other accessories are mounted in standardized cubicles which are vented through a common plenum, in the event of a circuit fault, to protect operating or maintenance personnel. A transition cubicle contains the input bushing for the electrical connection to the transformer and an optional circuit breaker to transfer the low voltage load to another transformer. An insulated cable assembly is used rather than using an open bus duct to interconnect the low voltage circuit breaker cubicles with the transition cubicle. A unique live voltage break twist-lock connector is used to terminate the low voltage circuit breakers.

BRIEF DESCRIPTION OF THE DRAWINGS

FIG. 2 is a top view of power distribution system shown in FIG. 1 with the radiator shown mounted on the transformer tank.

FIG. 3 is a side view in section of a portion of the feeder module showing the transition cubicle and two feeder cubicles.

FIG. 6 is a view in section of a twist lock connector used in the insulated cable assemblies.

FIG. 7 is an exploded perspective view of the twist lock connector.

FIG. 9 is a view of an alternate form of feeder module.

DETAILED DESCRIPTION OF THE INVENTION

Figure 1:
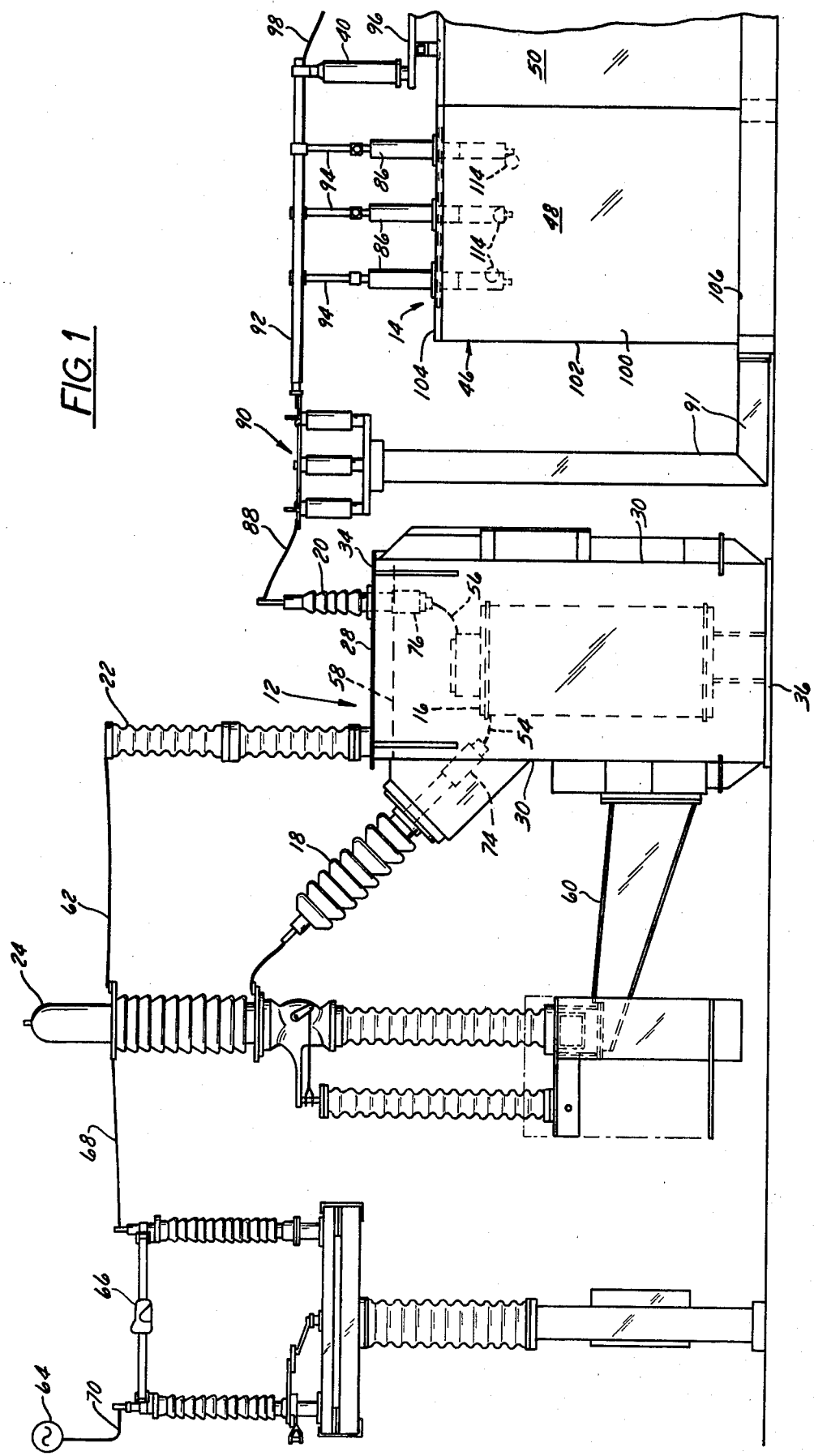
FIG. 1 is a side elevation view of the power distribution system according to the invention with the radiator bank removed.

The power delivery system generally includes a transformer module 12 and a feeder module 14. The transformer module 12 includes a transformer 16, primary bushings 18, secondary bushings 20, primary lightning arresters 22 and primary circuit breakers 24 as well as a radiator bank 26 all mounted directly on a transformer tank or housing 28 having sidewalls 30, end walls 32, a top 34 and a floor or base 36. These components are arranged on the housing 28 in a unique configuration which provides a low profile, increased safety, improved accessability and reliability as well as an increase in the overall efficiency of operation of the module.

The feeder module 14 includes the feeder breakers 38, secondary lightning arresters 40, fuses 42 and potential or voltage meter transformers 44 fuses. These components are arranged in a feeder housing 46 which is formed by a transition compartment or cubicle 48 and a number of feeder compartments or cubicles 50.

Electrical connection means in the form of shielded elastomeric insulated cable assemblies 52 are provided within the feeder module to connect the transition cubicle 48 to the feeder cubicle 50. The cable assemblies 52 eliminate the bare bus bars commonly used in switch gear providing a further improvement in safety for the linemen.

THE TRANSFORMER MODULE

As seen in FIGS. 1 and 2, the transformer 16 is mounted within the housing 28 with the primary bushing 18 connected to the primary winding of the transformer by means of a primary conductive line 54 and the secondary windings of the transformer connected to the secondary bushings 20 by means of secondary conductive lines 56. The transformer 16 is immersed in oil 58 provided in the tank or housing 28. A three-phase, two- or three-winding transformer can be used in the system. These transformers are of a multi-stepped core type to reduce no-load and load losses and are rated at maximum current available on the secondary for a given voltage. Current ratings for the transformers range from 200 through 3000 amps at 100 amp increments. In the present embodiment primary voltage classes range from 67 KV to 230 KV with the secondary classes ranging from 5 KV to 35 KV.

The profile of the transformer module 12 has been lowered to reduce space requirements to a minimum. This has been accomplished by mounting the primary bushings 18 on one of the sidewalls 30 of the housing 28 at an angle of approximately 45°. The primary circuit breakers 24 are supported on the same sidewall 30 of the housing 28 by means of brackets 60. The lightning arresters 22 are mounted on the top 34 of the tank 28 in close proximity to the circuit breakers 24. The circuit breakers 24 are connected to the corresponding primary bushings 18 by means of conductive lines 54.

The primary circuit breakers 24 are of the minimum oil type and provide protection both for a failure of the transformer as well as a failure in the circuitry on the low voltage side of the transformer. A minimum oil breaker clears the arc regardless of the current since it becomes dead open once it has been actuated. The low oil breakers 24 require only a few quarts of oil at the point of circuit interruption producing a substantial saving of oil in the system.

Overvoltage protection for both the circuit breakers 24 and the transformers 16 is provided by means of the lightning arresters 22. In this regard it should be noted that the lightning arresters 22 are mounted directly on the top 34 of the transformer housing 28 in close proximity to the transformer 16. It is generally understood that separation of the lightning arrester 22 from the transformer 16 more than a predetermined distance can cause a voltage upswing above the protective level of the transformer, which could result in overvoltage at the transformer higher than the transformer is designed for.

The lightning arresters 22 are connected by means of conductive lines 62 to the circuit breakers 24. The close proximity of the circuit breakers 24 to the primary bushings 18 makes it possible to maintain the close proximity of the lightning arresters 22 to the transformer for maximum protection.

The transformer module 12 is connected to a source of electrical power 64 such as a main transmission line by means of primary disconnect switches 66. The disconnect switches 66 are connected to the circuit breakers 24 by means of conductive lines 68 and to the power source 64 by means of conductive lines 70. The disconnect switches 66 are used to isolate the substation from the power source 64 for maintenance without de-energizing the main transmission line.

The transformer is cooled by means of the radiator bank 26 which is shown mounted on one of the endwalls 32 of the housing 28. The temperature rise contemplated for the transformer will be 65° C. for transformers designed with a maximum MVA of less than 14, the OA rating will be 80% of the maximum MVA and one stage of cooling fans (not shown) controlled by the top oil temperature will be used to circulate fluid through the radiator bank 26. For transformers rated above 14 MVA, the OA rating will be 60% of maximum MVA and two stages of cooling fans will be provided between the radiator bank and the transformer which will be controlled by winding temperature.

Figure 8:
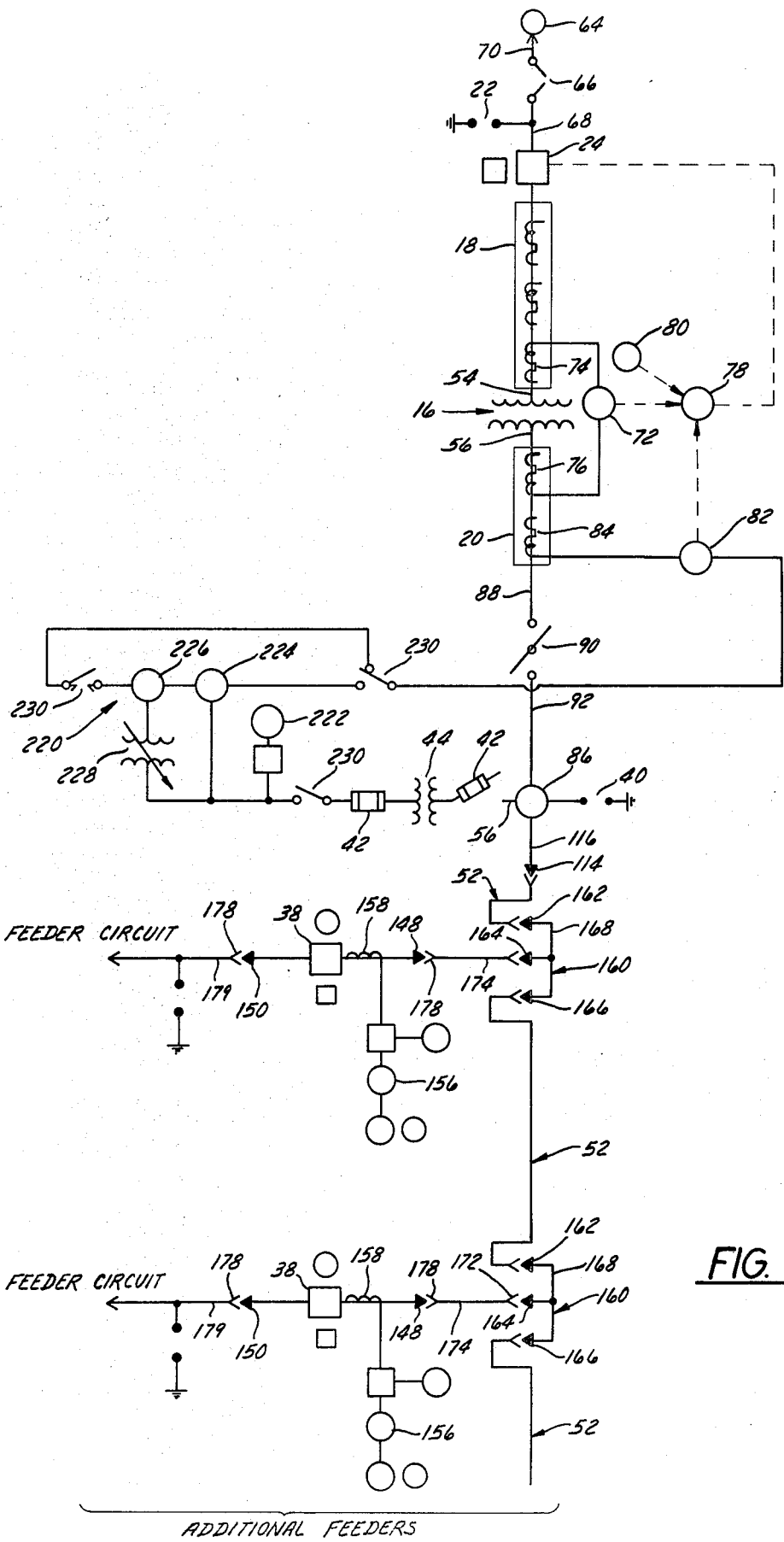
FIG. 8 is a circuit diagram for the power distribution system showing a single phase system.

Referring to FIG. 8, internal protection of the transformer is provided by means of a differential relay 72 connected to the primary line 54 and the secondary line 56 by means of current transformers 74 and 76, respectively, provided on the primary bushings 18 and the secondary bushings 20. The differential relay 72 being operatively connected to a lock out relay 78 which opens the circuit breaker 24 in the event of a differential line fault. The lock out relay 78 prevents closing of the circuit breakers until the lock out relay is reset. Means in the form of an overpressure relay 80 is connected to the lock out relay 78 to sense increased pressure in the transformer tank 28. If the pressure rise is excessive the relay 80 will actuate the lock out relay 78.

Over-current protection is provided on the secondary side of the transformer 16 by means of an over-current relay 82 which is connected to a current transformer 84 mounted on the secondary bushing 20. The relay 82 being operatively connected to the lock out relay 78 which is operatively connected to open the circuit breaker 24.

THE FEEDER MODULE

As seen in the drawings, the feeder module 14 includes a transition compartment or cubicle 48 and a number of feeder compartments or cubicles 50. Referring to FIG. 2 means are shown for connecting the feeder module 14 to the transformer module 12. Such means is in the form of a number of input bushings 86 provided on the top of the feeder module. The bushings 86 are connected to the secondary bushings 20 by means conductive lines 88 through disconnect switches 90. In this regard, it should be noted that the disconnect switches 90 are mounted on support brackets 91 mounted on the end of the feeder module. The disconnect switches 90 are connected to the bushings 86 by means of conductors 92 and cross connectors 94 located within aluminum tubes.

The secondary lightning arresters 40, fuses 42 and potential transformers 44 are mounted on a support rack 96 located on the top of the feeder module 14. The lightning arresters 40 are connected directly to the ends of the shielded conductors 92. The fuses 42 and potential transformer 44 are connected to the end of the conductors 92 by means of shielded cables 98.

Figure 4:
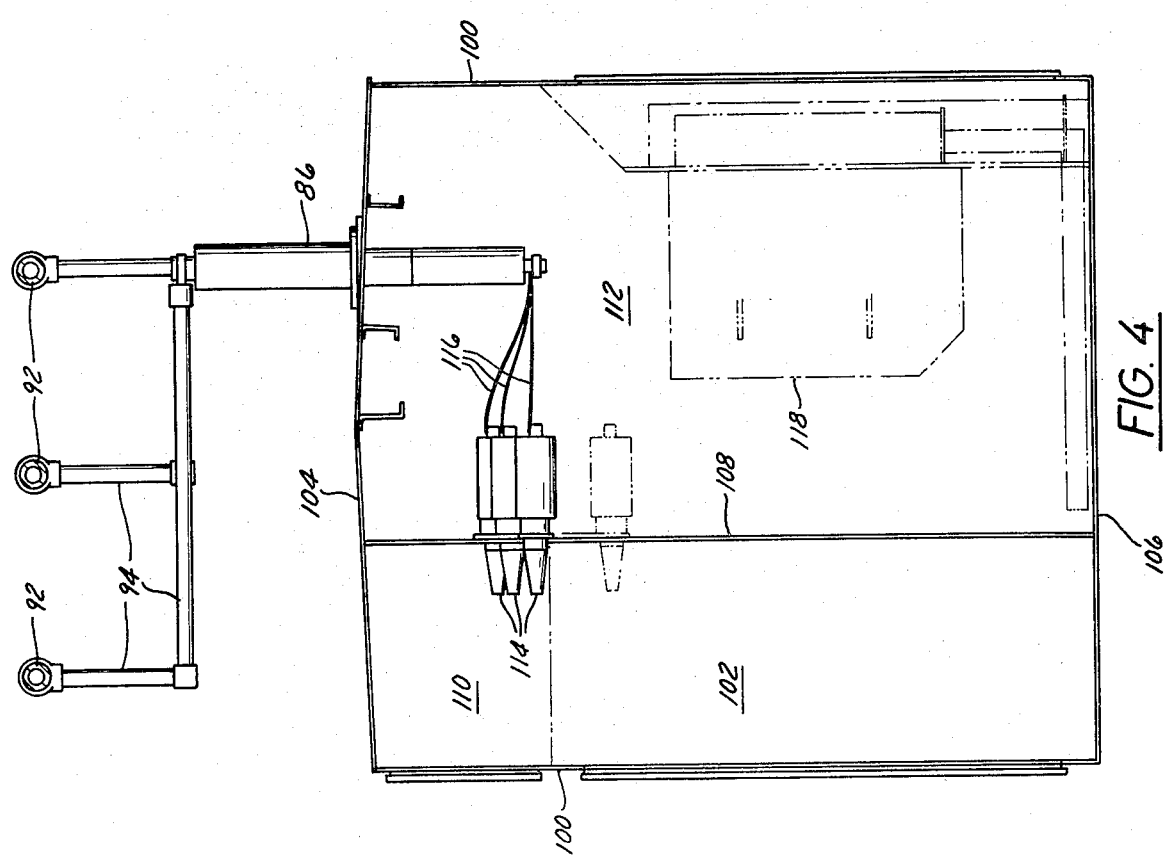
FIG. 4 is a view taken on line 4—4 of FIG. 3 showing the transition cubicles.

The transition cubicle 48 as seen in FIG. 4 is formed by a pair of side walls 100 and ends walls 102, a top or roof 104 and a bottom or floor 106. The cubicle is divided by means of a front panel 108 into a cable compartment 110 and an optical circuit breaker compartment 112. The feed through input bushings 86 are connected to Visi break type feed through bushings 114 by means of cables 116. An optional low voltage circuit breaker 118, shown dotted in FIG. 4, can be provided in the transition cubicle if two or more power delivery systems are to be used in a single substation.

Figure 5:
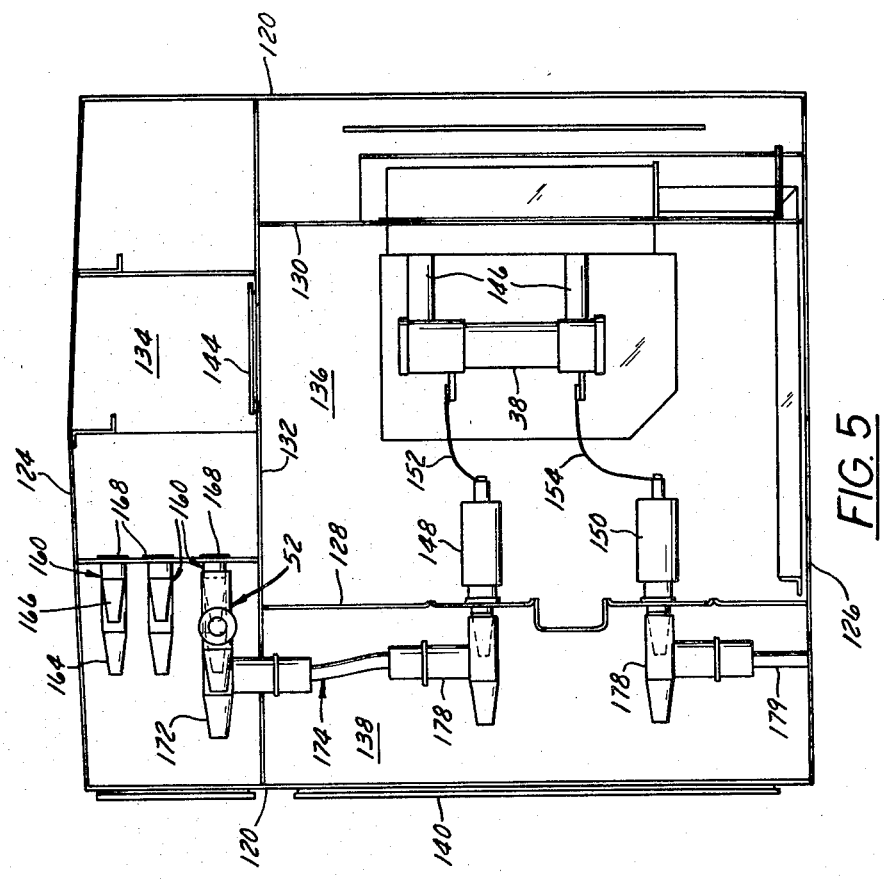
FIG. 5 is a view taken on line 5—5 of FIG. 3 showing one of the feeder cubicles.

Each of the feeder cubicles 50, as seen in FIG. 5, includes a pair of side walls 120, end walls 122, a top or roof 124 and a bottom or floor 126. The cubicle is divided by means of a front panel 128, back panel 130 and a top panel 132 into a plenum chamber 134, a breaker chamber 136 and a cable chamber 138. Access to the cable chamber 138 is provided by means of doors 140 provided in the front side wall 120 of the cubicle and to the breaker chamber 136 by means of a door 142 provided in the front panel 128.

Means are provided in the top panel 132 to relieve pressure within the breaker chamber 136 in the event of a secondary fault. Such means is in the form of a one-way valve provided by means of a hinged plate 144 in the top panel 132. The one-way valve plate 144 is hingedly connected to the panel 132 by means of hinge pins (not shown). The plate 144 has sufficient weight to remain closed until pressure in the breaker chamber 136 is sufficient to overcome the weight of the plate 144. Gases vented through the valve plate 144 into the plenum chamber 134 are vented to atmosphere through one way vent valves (not shown) provided in the end walls of the feeder cubicles. High pressure gases generated in the transition cubicle are vented through a one way vent valve in end wall 122 into the plenum chamber in the adjacent feeder cubicle. The vent valves in the end walls 122 are arranged to vent the gases to atmosphere in a direction away from the transition cubicle.

The low voltage feeder circuit breakers 38 are located in the breaker chamber 136 and are also of the minimum oil type requiring simple maintenance and inspection procedures. The breakers are fixedly supported in the breaker chamber 136 by means of insulating support brackets 146 provided on the back panel 130. Means in the form of feed through bushings 148 and 150 are mounted on the front panel 128 and are connected to the circuit breakers 38 by means of electrical conductors 152 and 154. Overcurrent protection for the circuit breakers 38 is provided by means of relays 156 which are connected by means of current transformers 158 to respond to fault current in the secondary voltage line.

Means are provided in the feeder cubicles 50 for connecting the feeder cubicles to the transition cubicles 48 or to the next feeder cubicles 50 in the feeder module. Such means is in the form of bushing junctions 160 mounted on the top of front panels 128 in the feeder cubicles. Each bushing junction 160 includes three bushings 162, 164, and 166 interconnected by a common bus bar 168. The center bushings 164 in each junction 160 projects outward from the other bushings 162, 166 to provide clearance as described hereinafter. The center bushing 164 is used to connect the bushing junction 160 to the circuit breaker bushing 148. One of the end bushings 162 is used to connect the junction 160 to the transition bushing 114. The other bushing 166 is used to connect the secondary line to the bushing junction 160 in the next feeder cubicle 50.

The electrically insulated connecting means are provided for connecting the bushings 114 to the bushings 162, 164, 166 in the feeder cubicles 50 in the transition cubicle 48. Such means is in the form of flexible, shielded, insulated cable assemblies 52. Each of the cable assemblies 52 is fully insulated thus eliminating bare bus bars within the feeder module thereby increasing the safety for the linesmen. Each of the assemblies 44 includes a shielded cable 170 having an elbow type cable terminator 172 at each end.

The terminators 172 and the bushings 114, 162, 164 and 166 are preferably of the visible break or "Visibreak" type. This type of terminator-bushing arrangement is disclosed in U.S. Pat. No. 3,883,208 issued on May 13, 1975 entitled "Visible Break Tee Connectors" and incorporated herein by reference. The visible break elbow is used to terminate load when both current and voltage are turned off. This is commonly referred to as a "Dead Break" terminator.

The elbow terminator of the present invention uses the same "Dead Break" terminator in a live break application, i.e., voltage is on, current is off. This has been achieved by applying the source voltage to the terminator or tee which is insulated from the ground plane on the elbow.

The bushing junction 160 in the feeder cubicles is connected to the low voltage circuit breaker bushings 148 by means of cable assemblies 174 which include an insulated cable 176 having a Visi Break terminator 172 at one end and a unique twist-lock terminator 178 at the other end. Since the connection to the low voltage bushings 148, 150 can be a live no load condition a "Hot Stick" must be used to make the connection. However, a "Visi Break" terminator must be screwed into the bushing and requires considerable torque in order to seat the threaded connector in the threaded bore of the bushing. This cannot be reliably accomplished with a "Hot Stick." A twist-lock terminator was therefore designed for installation by a "Hot Stick" in the low voltage circuit breaker bushings.

TWIST LOCK TERMINATOR

In this regard and referring to FIGS. 6 and 7, it should be noted that terminators 178 are of the twist-lock type having a connector mounted within an elastomeric housing 182. The connector 180 includes a probe 184 having means for positively locking the terminators 178 to the bushings 114, 116. Such means is in the form of an annular groove 186 and a slot 188 provided in the end of the probe 184 which is adopted to be inserted into the bore 190 of the contact 192 for engagement with a pin 194.

The connector 180 is formed from a single piece of conductive material having the probe 184 at one end and an annular flange 196 intermediate the ends thereof. A hexagonal opening 198 is provided in the opposite end of the connector with a threaded section 200 provided on the outside surface of the opposite end of the connector. Conductive bands 202 and 204 are provided on the connector on each side the flange 196.

The connector 180 is supported in the housing 182 by means of a hollow conduction sleeve 206. The sleeve 206 includes a threaded section 208 at one end and a hexagonal opening 210 at the other end. The sleeve 206 is mounted on the connector 180 by turning the threaded section 208 onto the threaded section 200 on the connector 180.

On assembly, the insulated cable 176 is provided with a crimp type cable connector 212 having an eye or opening 214 at the end. The cable connector 212 is inserted into the housing 182 with the eye 214 aligned with the opening in the housing 182. The connector 180 is inserted into the opening 214 until flange 196 abuts the cable connector 212. The sleeve 206 is inserted into the housing 182 with the threaded section 208 in alignment with the threaded section 200 on the connector 180. Appropriate tools (not shown) are then inserted into the hexagonal openings 198 and 210 and turned in opposite directions until the sleeve 206 is seated against the cable connector 212.

As seen in FIG. 6 when the terminator 178 is mounted on one of the bushings 148, 150, a "hot stick" is used to push the probe 184 into the bore 190 of contact 194. A "hot stick" is used since the cable is connected to the source voltage and is therefore a live connection. The slot 188 is aligned with the pin 194 and the probe 184 pushed into the bore 190 until the pin 194 abuts against the annular groove 186. The "Hot Stick" is provided with a hexagonal section to engage opening 198 in the connector 180. The "Hot Stick" is then rotated until the pin 194 seats against the end of the groove 186.

Means can be provided within the contact 192 to hold the probe 184 in position in the contact 192. Such means is in the form of a spring 216 and plug 218 provided in the bore 190 of contact 192. With this arrangement, the terminators 172 are locked on the bushings 114 Or 116 on 180° rotation of the contact 180 with respect to the contact 192.

CIRCUIT DIAGRAM

Referring to FIG. 8, a circuit diagram for a single phase power delivery system is shown for purposes of explanations only since the invention has application in three phase systems as well. As seen in the diagram, the primary disconnect switch 66 and lightning arrester 22 are shown on the line side of the primary circuit breaker 24. The disconnect switch providing for removal of the substation from the transmission line 64 without interfering with main line service. The lightning arrester 22 thus providing protection for both the circuit breaker 24 and the transformer 16 in the event of an over current surge.

The current transformers 74 and 76 for the differential relay 72 are shown mounted on the primary bushing 18 and secondary bushing 20, respectively, and operatively connected to the lock out relay 78 for the circuit breakers 24. The current transformer 84 for the overcurrent relay 82 is also shown mounted on the secondary bushing 20. It should be noted here that additional current transformers can be provided on the bushings 18 and 20 for additional customer service if required.

The secondary lightning arresters 40, fuse 42, and potential transformers 44 are connected to the secondary line 56 at the top of the input bushing 86. The motor operates a secondary disconnect switch 90 provided in the secondary line 56 to isolate the feeder module from the transformer for maintenance or repair. A metering circuit 220 can be provided on the low voltage line 56 if desired. The metering circuit 220 generally includes a volt meter 222, a watt meter 224, a VAR meter 226, and a phase shifting potential transformer 228. Switches 230 are provided to selectively operate the metering circuit. This type of circuit is standard in a substation and can be varied to accommodate a customer's needs.

The input bushing 86 is connected to the transition cubicle feed through bushings 114 by lines 116. The feed through bushings 114 are connected to one of the bushings 162 in the bushing junctions 160 by means of fully insulated cable assemblies 52. One of the bushings 166 in the first feeder cubicle is connected to the bushings 162 in the next feeder cubicle by means of a cable assembly 52. The center bushing 164 is connected to the circuit breaker bushing 148 by means of cable assembly 174. The cable assembly 174 including a visible break terminator 172 at one end and a twist lock terminator 178 at the other end. The circuit breaker bushing 150 is connected to the load cable 179 by means of a twist lock terminator 178.

T-FEEDER MODULE

In FIG. 9 a T-type feeder module 220 is shown which includes a transition cubicle 48 with feeder cubicles 50 connected to each side of the transition cubicle 48. Wherever like parts or assemblies have been used in the T-type feeder module, the same members have been used as in FIGS. 1-6. With this arrangement, the number of feeder cubicles may be increased to six, three on each side of the transition cubicle. This has been achieved by including an additional feed through bushing 115 for each feed through bushing 114. The additional feed through bushing 115 is connected to the original feed through bushing 114 by means of a bus bar 117. Electrical connections to the adjacent feeder modules 50 is completed by means of cable assemblies 52 described above.

Means may also be provided for venting the transition cubicle to the plenum chambers in the adjacent feeder cubicles. Such means is in the form of one way valves provided in the end walls of the transition cubicles.

RESUME

The power distribution system as described above combines a preassembled transformer module with a preassembled feeder module. Since the modules are preassembled they can be interconnected and fully tested at the point of manufacture. The transformer module includes the primary bushing, primary circuit breaker and lightning arrester making it possible to provide a low profile for the transformer module. Insulated cable assemblies are used to interconnect the transition and feeder cubicles thus eliminating bare bus bars. An explosion proof feeder module is achieved by providing a plenum chamber in the feeder cubicle which vents high pressure gases to atmosphere.

We claim:

1. A power delivery system comprising a transformer module and a feeder module,
   said transformer module including a transformer tank,
   insulating oil in said tank and
   a transformer having primary and secondary windings immersed in said oil in said tank;
   means mounted on said tank for connecting said primary winding to a power source, said means including a primary bushing mounted on the sidewall of said tank,
   a circuit breaker mounted on the sidewall of said tank adjacent to said primary bushing, conductive means connecting said circuit breaker to said primary bushing,
   a lightning arrester mounted on the top of said tank in close proximity to said primary bushing and means connecting said lightning arrester to said circuit breaker on the power source side of said circuit breaker; and
   a number of secondary bushings mounted on said tank;
   said feeder module including a housing having a transition cubicle and a feeder cubicle,
   electrically conductive means connecting said secondary bushing to said transition cubicle, and
   electrically conductive insulated cable assembly means connecting said transition cubicle to said feeder cubicle.

2. The system according to claim 1 wherein said primary bushing is mounted at an angle on the sidewall of said tank whereby said primary bushing is disposed in close proximity to said circuit breaker.

3. The system according to claim 2 wherein said angle is approximately 45°.

4. The system according to claim 1 wherein said cable assembly means includes an insulated shielded cable having a visible break terminator at each end.

5. The system according to claim 1 wherein said transition cubicle includes a panel dividing said cubicle into a cable compartment and a circuit breaker compartment,
   an input bushing mounted on said transition cubicle and projecting into said breaker compartment,
   said input bushing being connected to said electrically conductive means,
   a feed through bushing extending through said panel,
   an electrically conductive member connecting said input bushing to said feed through bushing,
   said feeder cubicle including a front panel,
   a back panel and a top panel, said panels defining a cable chamber, a feeder breaker chamber and a plenum chamber within said feeder cubicle,
   a bushing junction mounted on said front panel, said bushing junction including at least two bushings,
   said insulated cable assembly means including a visible break terminator at each end for connecting said feed through bushing to one of said junction bushings.

6. The system according to claim 5 wherein said feeder cubicle includes a circuit breaker in said feeder breaker chamber and a pair of circuit breaker bushings mounted in said front panel; said circuit breaker bushings being operatively connected to said circuit breaker, and a second insulated cable assembly means connecting one of said junction bushings to one of said circuit breaker bushings.

7. The system according to claim 6 wherein said circuit breaker bushings are twist lock type bushings said second cable assembly means includes a shielded cable having a twist lock type terminator for connecting said second assembly to said breaker bushing and a visible break terminator at the other end for connecting said second assembly to said junction bushing.

8. The system according to claim 5 including one way valve means in said top panel of said feeder cubicle for connecting said breaker compartment to said plenum chamber.

9. The system according to claim 8 including means for venting said plenum chamber to atmosphere.

10. The system according to claim 1, 2, 4, 5, or 8 wherein said feeder module and transformer module are preassembled for delivery as complete units whereby said modules can be fully tested after assembly and prior to delivery.

11. A transformer module for a distribution substation, said transformer module comprising a tank having sidewalls, end walls, a top wall and a floor, insulating oil in said tank, a transformer having primary and secondary windings immersed in the oil in said tank, a radiator connected to said tank and means for circulating oil from said tank through said radiator, a primary bushing mounted on an angle on one of the sidewalls of said tank, a secondary bushing mounted on the top of said tank, means for connecting the primary bushing to said primary winding, a primary circuit breaker, means mounting said primary circuit breaker on the same sidewall of said tank as said primary bushing, a lightning arrester mounted on the top wall of said tank in close proximity to said primary bushing, means connecting the primary bushing, circuit breaker and lightning arrester to a high voltage power source, said lightning arrester being connected to said circuit breaker on the power source side, whereby said lightning arrester protects both the circuit breaker and transformer from fault conditions on the power source side.

12. The combination with a transformer module according to claim 11 of a feeder module including a transition cubicle and a feeder cubicle, said transition cubicle including means connecting said feeder module to said transformer module, said feeder cubicle including a low voltage circuit breaker, and insulated cable assembly means connecting said transition cubicle to said feeder cubicle, said cable assembly means including, a shielded cable and a visible break terminator at each end of said cable.

13. The combination according to claim 12 wherein said feeder module includes a second feeder cubicle.

14. The combination according to claim 13 wherein said second feeder cubicle is positioned next to said first feeder cubicle.

15. The combination according to claim 14 including a second insulating cable assembly means connecting said first feeder cubicle to said second feeder cubicle, said second insulating cable assembly means including a shelded cable and a visible break terminator at each end of the cable.

16. The combination according to claim 13 wherein said second feeder cubicle is positioned next to said transition cubicle on the side opposite the first feeder cubicle.

17. The combination according to claim 16 including second insulated cable assembly means connecting said transition cubicle to said second feeder cubicle, said second insulating cable assembly includes a shielded cable and a visible break terminator at each end of said cable.

18. The terminator according to claim 16 wherein said engaging means comprises an axially extending slot in the end of the probe and an annular slot at the end of the axially extending slot whereby said probe may be locked to the bore contact by aligning the pin with the axial slot and twisting the conductive member to seat the pin in the annular slot.

19. A feeder module for a distribution substation, said feeder module comprising a housing having a transition cubicle and a feeder cubicle, said transition cubicle including means for connecting the transition cubicle to a low voltage source, said feeder cubicle including a low voltage circuit breaker, and shielded insulated cable assembly means connecting said transition cubicle to said feeder cubicle, said cable assembly means including a shielded cable and a visible break terminator at each end of said shielded cable.

20. The feeder module according to claim 19 wherein said low voltage connecting means includes an input bushing, a feed through bushing, and bus means connecting the input bushing to said feed through bushing, said cable assembly means being connected to said feed through bushing.

21. The feeder module according to claim 19 or 20 wherein said feeder cubicle includes a pair of feed through bushings connected to said circuit breaker and a bushing junction having three taps, said cable assembly means connecting said transition cubicle to one of said bushing junction taps, and including a second cable assembly means connecting one other of said bushing junction taps to one of said low voltage circuit breaker bushings, said second cable assembly means including a shielded cable having a visible break terminator at one end of said cable, and a twist lock terminator at the other end of said cable, said twist lock terminator being connected to said low voltage circuit breaker bushing.

22. The feeder module according to claim 21 wherein said first cable assembly means provides a dead break live disconnect from said bushing junction tap.

23. A twist-lock terminator for connecting a high voltage cable to a high voltage bushing, said bushing having a bore contact with a radially inwardly extending pin located a spaced distance from the open end of the contact, and a spring biased assembly within said bore contact, said terminator comprising a housing formed from an insulating material, an electrically conductive connector connected to said cable and positioned within said housing, a conductive member positioned in said housing, said member being in electrical communication with said connector and having a probe adapted to be inserted into the bore contact in said bushing and engaging means on said probe for engaging the pin in said bore contact to lock the terminator to the bushing, said probe compressing said spring biased assembly until the slot is aligned with the pin whereby said probe can be rotated into engagement with said pin.

* * * * *